United States Patent [19]
Sawamura

[11] Patent Number: 5,270,487
[45] Date of Patent: Dec. 14, 1993

[54] GROMMET

[75] Inventor: Naohito Sawamura, Yokkaichi, Japan

[73] Assignee: Sumitomo Wiring Systems, Ltd., Mie, Japan

[21] Appl. No.: 936,315

[22] Filed: Aug. 28, 1992

[30] Foreign Application Priority Data

Aug. 30, 1991 [JP] Japan ................... 3-219704

[51] Int. Cl.$^5$ ............................ H05K 1/00
[52] U.S. Cl. ................ 174/31 R; 174/65 G; 174/152 G; 248/56
[58] Field of Search .......... 174/31 R, 153, 65 G, 174/152 G, 153 G, 167; 248/56; 277/178; 439/567, 604

[56] References Cited

U.S. PATENT DOCUMENTS 3,919,460 11/1975 Neail et al. .
4,103,136 7/1978 Karakis et al. .
4,267,628 5/1981 Izraeli .
4,406,041 9/1983 DeAnda et al. .
4,797,513 1/1989 Ono et al. ................. 174/153

FOREIGN PATENT DOCUMENTS 63-194517 12/1988 Japan .

Primary Examiner—Leo P. Picard
Assistant Examiner—Cheryl R. Figlin
Attorney, Agent, or Firm—Sughrue, Mion, Zinn, Macpeak & Seas

[57] ABSTRACT

A grommet is provided with a small diameter cylindrical portion defining a first aperture and an expanded diameter portion defining a second aperture which is in communication with the first aperture for inserting a wire harness. In the second aperture of the expanded diameter portion, one end of a bag-shaped portion enclosing the wire harness at a spaced relationship therewith is connected with an end face of the small diameter cylindrical portion. The other end of the bag-shaped portion is made as a tightening portion which sealingly fits with the outer periphery of the wire harness. A gelatinous filler material made of silicone or the like is sealed in the interior of the bag-shaped portion. The small diameter cylindrical portion and the tightening portion are bound with a clamping device against the outer periphery of the wire harness.

3 Claims, 3 Drawing Sheets

GROMMET

BACKGROUND OF THE INVENTION

1. Field of the Invention

The present invention relates to a grommet, and in particular to a grommet having a waterproof and soundproof structure to improve installation workability of the same on a panel for vehicles or the like.

2. Description of the Prior Art

Conventionally, there have been provided a variety of grommets each of which is fitted on a panel of a vehicle or the like with the assembly of a wire harness inserted through an inserting hole formed in the panel.

FIG. 5 shows an example of conventional grommets. In FIG. 5, a grommet body 1 is made of an elastic material and includes a cylindrical portion 1a of a small diameter for supporting a wire harness 2 in a manner such that the wire harness is inserted through the inner hole of the cylindrical portion 1a. The grommet body further includes an expanded diameter portion 1b which communicates concentrically with the small diameter cylindrical portion 1a. The expanded diameter portion 1b is provided with a flange 1c at its peripheral edge, and the flange 1c has an annular groove 1d formed therein. A panel 3 has an inserting hole 3a formed therein generally corresponding to the expanded diameter portion 1b, and the annular groove 1d of the flange 1c is engaged with the edge of the inserting hole 3a defined in the panel 3 thereby to tightly hold the grommet body 1 fitted on the panel 3.

When assembling the grommet body 1 with the wire harness 2 which is composed of electric wires 5, the wire harness 2 is inserted through the small diameter cylindrical portion 1a and the expanded diameter portion 1b in the first stage, and then a filler 4 made of a liquid setting material is filled into the expanded diameter portion 1b thereby to securely holding the wire harness 2 in the grommet body 1. After the filler material 4 has been set, the assembly composed of the grommet body 1 and the wire harness 2 insertingly held therethrough is fitted into the inserting hole 3a of the panel 3.

In the grommet body 1 mentioned above, a gap between the outer periphery of the wire harness 2 and the inner surface of the grommet body 1 as well as gaps made relative to each other between the electric wires 5 which compose the wire harness 2 are filled with the liquid filler setting material 4 to improve the waterproof and sound-proof properties.

In the grommet thus composed, however, there is a problem in workability in that, when the assembly composed of the grommet body 1 and the wire harness 2 insertingly held thereby is fitted into the inserting hole 3a formed in the panel 3, it is not easy to engage the edge of the inserting hole 3a of the panel 3 with the annular groove, 1d formed in the flange 1c of the grommet body 1. This is because, when the liquid filler material 4 is once hardened to be solid, it is difficult to deform the grommet body 1 in the area containing therein the filler material 4 which has already been set.

On the other hand, one may choose a structure in which the small diameter cylindrical portion 1a is strapped up with a tape to tightly hold the wire harness 2 without using a liquid filler material. In this structure, it is then difficult to ensure sufficient waterproof and soundproof properties as compared with the structure in which the filler material is utilized.

Furthermore, since the wire harness 2 and grommet body 1 are tightly bonded with each other via the hard filler material 4, when an external force such as a tension for example, is applied to the wire harness 2, the applied external force will be transferred to the grommet body 1 through the filler 4, which may sometimes cause the grommet body 1 to be removed from the panel 3.

SUMMARY OF THE INVENTION

The present invention is therefore, designed in order to solve the above-mentioned problems involved in the conventional grommet and has an essential object to provide an improved grommet in which workability is improved by ease of installation on a vehicle panel while maintaining waterproof and soundproof properties, and at the same time reducing the effect of an external force applied to the wire harness after the grommet is fitted on the panel.

Therefore, the present invention provides a grommet having a through-hole for inserting a wire harness therethrough and a groove formed on the outer periphery thereof for engagement with an edge of an inserting hole formed in a panel or the like, which is characterized in that the grommet is provided with a bag-shaped portion protruding integrally therewith from the periphery of the through-hole and enclosing the inserted wire harness leaving a space therebetween and that a fluid gelatinous filler material is sealingly contained within the bag-shaped portion, and a peripheral edge of an opening defined at the other end of the bag-shaped portion is securely fitted with the outer periphery of the wire harness.

More particularly, the grommet of the present invention is provided with a small diameter cylindrical portion including a first aperture sealingly fitted with the outer periphery of the wire harness and provided with an expanded diameter portion including a second aperture larger than the small diameter cylindrical portion in diameter, which are communicated with each other to form a through-hole by the first and second apertures. In the second aperture of the expanded diameter portion, the bag-shaped portion is provided with its one end connected to the linking portion between the expanded diameter portion and the small diameter cylindrical portion, while on the opening at the other end of the bag-shaped portion there is provided a tightening portion which sealingly fits with the outer periphery of the wire harness, and the tightening portion and the small diameter cylindrical portion are bound to the outer periphery of the wire harness by a clamping means to seal the interior of the bag-shaped portion.

For the gelatinous filler material mentioned above, such materials, for example, as silicone, paraffine, acrylic aqueous gel, urethane aqueous gel, epoxy resin or the like may be selected.

As the clamping means mentioned above, adhesive tape means, belt means or the like may be used.

Moreover, two kinds of gelatinous filler materials may be used, that is, one filler of low fluidity having a higher viscosity than the other is used for filling the two opening sides of the bag-shaped portion corresponding to the small diameter cylindrical portion and the tightening portion, and the other filler having a relatively lower viscosity is used for filling the intermediate area inside the bag-shaped portion.

In the grommet according to the present invention, by virtue of the structure as mentioned above, the gelatinous filler material of a certain degree of fluidity penetrates into a gap between the outer periphery of the wire harness 2 and the inner surface of the grommet body as well as gaps formed among the electric wires composing the wire harness 2 to fill these gaps, rendering the waterproof and soundproof of the grommet.

In addition, since the grommet according to the present invention has a hermetic sealing structure containing the gelatinous filler material having a degree of fluidity filled within the bag-shaped portion of the grommet body, the grommet is easily deformable without having any hard portion difficult to change in shape therein and can be readily deformed to be fit in the through-hole of a panel or the like.

Furthermore, when an external force is applied to the wire harness after attaching the grommet on the panel, the applied external force is absorbed by the fluid gelatinous filler material as mentioned above.

When using a low fluidity gelatinous filler material having a relatively higher viscosity for filling the two opening sides of the bag-shaped portion corresponding to the small diameter cylindrical portion and the tightening portion than that for filling the intermediate area between the two opening sides thereof, leakage of the gelatinous filler material from the small diameter cylindrical portion or the tightening portion can be securely prevented.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE PREFERRED EMBODIMENTS

Preferred embodiments of the present invention will now be fully explained according to the attached drawings.

Figure 1:
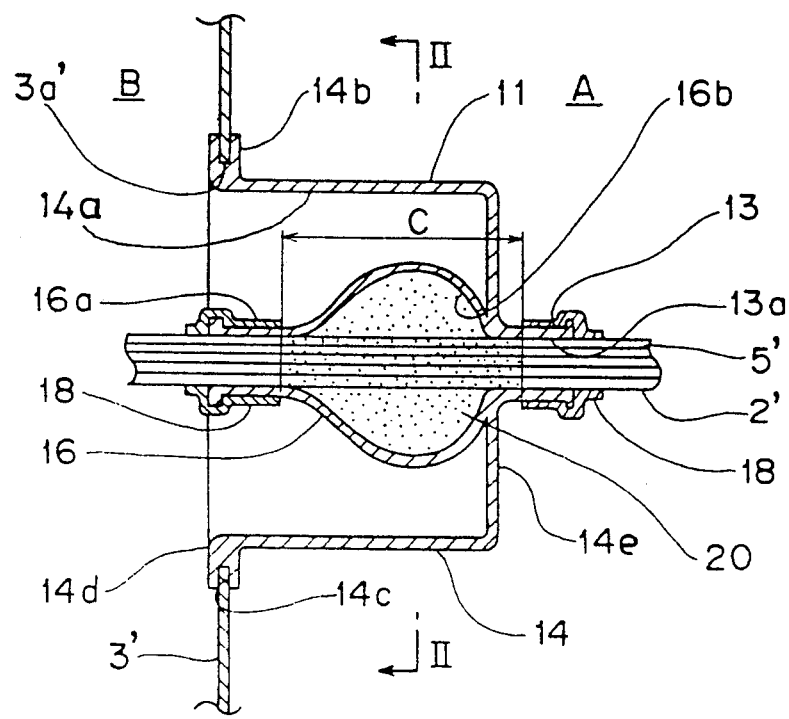
FIG. 1 is a sectional view showing a first embodiment of the grommet according to the present invention.

FIG. 1 shows a first embodiment of a grommet according to the present invention, in which a grommet body 11 is made of an elastic material such as rubber or the like. The grommet body 11 comprises a small diameter cylindrical portion 13 defining a first aperture 13a and an expanded diameter portion 14 defining a second aperture 14a the diameter of which is larger than that of the first aperture 13a. A wire harness 2' composed of electric wires 5' including gaps among them is inserted through the first aperture 13a in such a manner that the edge portion of the first aperture 13a is elastically fitted with an outer periphery of a wire harness 2' and the wire harness 2' is also inserted through the second aperture 14a with a space. The small diameter cylindrical portion 13 and the expanded diameter portion 14 are communicated with each other to form a through-hole by the first and second apertures 13a and 14a where the wire harness 2' passes therethrough.

The expanded diameter portion 14 has a flange 14b provided at the edge thereof in which an annular groove 14c is formed in the outer periphery thereof so that the edge of an inserting hole 3a' formed in a panel 3' is engaged with the annular groove 14c defined in the flange 14b.

The grommet 11 is fitted in the inserting hole 3a' defined in the panel 3' in such a way that the small diameter cylindrical portion 13 and the expanded diameter portion 14 are located in the outside A in FIG. 1 with respect to the panel 3', while an open end 14d of the second aperture 14a of the expanded diameter portion 14 is located in the inside B in FIG. 1 with respect to the panel 3'.

The wire harness 2' is previously passed through the first aperture 13a of the small diameter cylindrical portion 13 and is then inserted in the second aperture 14a with a space. In the expanded diameter portion 14 there is provided a bag-shaped portion 16 enclosing the wire harness 2' with a space and extending toward the open end 14d of the second aperture 14a from a peripheral edge where a bottom wall 14e of the expanded diameter portion 14 links with the root portion of the small diameter cylindrical portion 13.

At the other end of the bag-shaped portion 16, that is, on the left opening side in FIG. 1 of the bag-shaped portion 16, is provided a tightening portion 16a which elastically fits with the outer periphery of the wire harness 2'.

The first aperture 13a of the small diameter cylindrical portion 13 is also closely fitted with the outer periphery of the wire harness 2' as mentioned above, and the small diameter cylindrical portion 13 and the tightening portion 16a are bound to the outer surface of the wire harness with a tape 18 which forms a clamping means to tightly clamp them with the wire harness 2 so as to form a hermetical sealing structure C of the interior portion 16b of the bag-shaped portion 16.

The interior portion 16b of the bag-shaped portion 16 is sealingly filled with a gelatinous filler material 20 made of silicone having a certain degree of fluidity with a viscosity in the range of 500–700 (cP).

Figure 2:
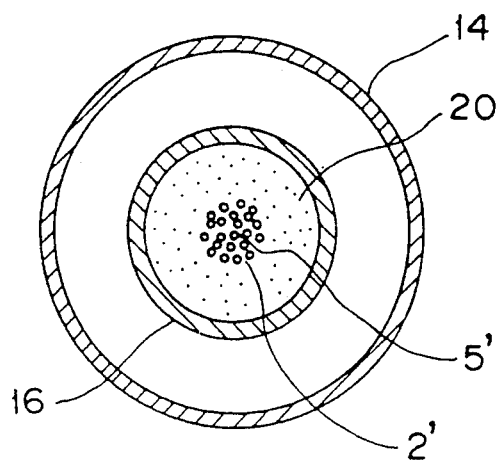
FIG. 2 is a sectional view taken along the lines II—II of FIG. 1.
Figure 3:
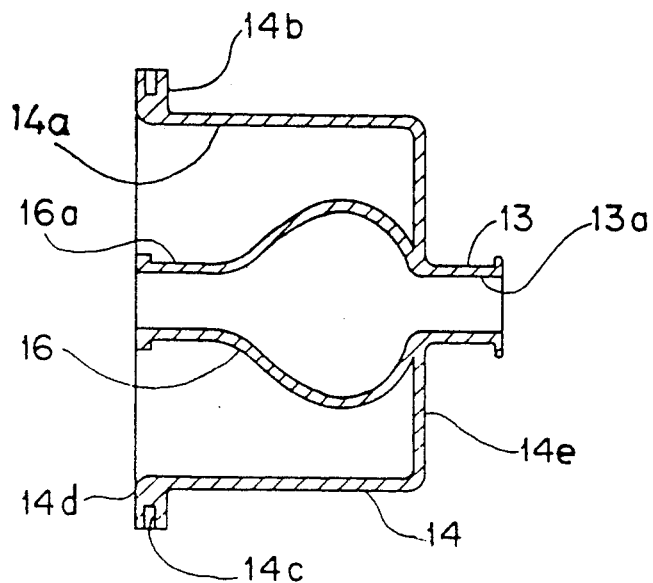
FIG. 3 is a sectional view showing the grommet body.

In the first embodiment of the present invention, the gelatinous filler material 20 penetrates into the gap between the outer periphery of the wire harness 2' and the grommet body 11 as well as the gaps defined among the electric wires 5' composing the wire harness 2' to fill these gaps (see especially FIG. 2), whereby a high degree of waterproof property can be obtained.

In addition, since the gelatinous filler material 20 has a certain degree of fluidity, the wire harness 2' is deformable in the bag-shaped portion 16 thereby to render the grommet body 11 flexibility.

Next, now explained will be a procedure of attaching the grommet body 11 into the inserting hole 3a' of the panel 3' while supporting the wire harness 2' inserted therein.

In the first stage, the wire harness 2' is inserted into the small diameter cylindrical portion 13 passing through the tightening portion 16a of the bag-shaped portion 16 which has been elastically spread out, and the tape 18 is then strapped up around the small diameter cylindrical portion 13 to clamp the small diameter cylindrical portion 13 to the wire harness 2'.

Then, a required amount of the gelatinous filler material 20 is poured into the interior 16b of the bag-shaped portion 16 through the spread tightening portion 16a. The tightening portion 16a is then strapped up with the tape 18 to be clamped to the wire harness 2' so as to form a hermetically sealed structure containing the gelatinous filler material 20 within the interior 16b of the bag-shaped portion 16.

Finally, the grommet body 11 supporting the wire harness 2' inserted therein is fitted in the inserting hole 3a' of the panel 3'.

The grommet thus assembled has a hermetically sealed structure containing the gelatinous filler material 20 having a certain degree of fluidity, and also being airtight and waterproof. The grommet body 11 is also easily deformable without having any hard portion therein and can be readily deformed to engage the edge of the inserting hole 3a' with the annular groove 14c of the flange 14b.

In this embodiment, although the small diameter cylindrical portion 13 is clamped first with the tape 18 in the above example, the tightening portion 16a can of course be clamped first to the wire harness 2 and then the gelatinous filler material 20 is poured into the interior 16b, thereafter strapping up the tape 18 around the small diameter cylindrical portion 13.

Even in the case where an external force such as tension is applied to the wire harness 2 after the grommet body 11 has been attached to the panel 3 as mentioned above, this external force is absorbed to a certain extent by the fluid gelatinous filler material 20 which is flexible to be deformed. With this structure, the external force will not be transferred to the grommet body 11, and hence, the annular groove 14c will not be disengaged from the edge of the inserting hole 3a, thereby avoiding the grommet body 11 from coming off of the panel 3.

Figure 4:
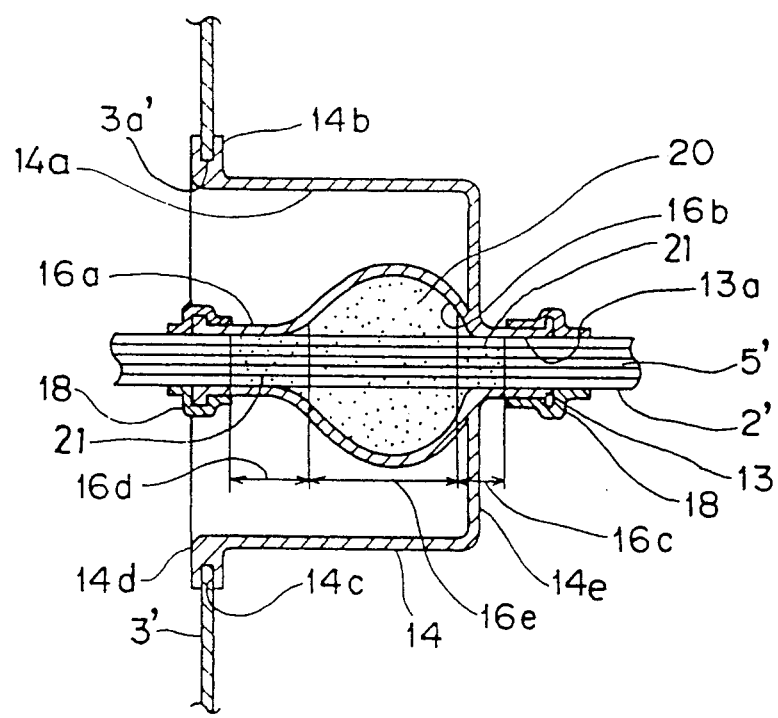
FIG. 4 is a sectional view showing a second embodiment of the present invention.
Figure 5:
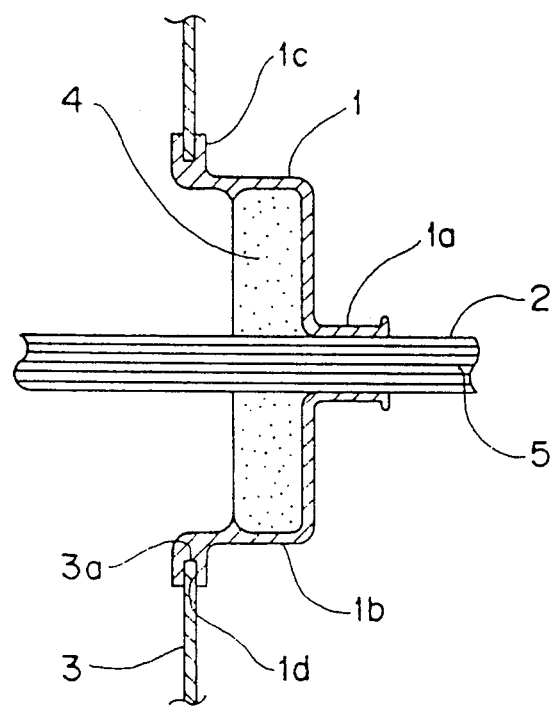
FIG. 5 is an example of a conventional grommet.

In the second embodiment of the present invention shown in FIG. 4, another relatively low fluid gelatinous filler material 21 made of silicone with a viscosity in the range of 1,000-5,000 (cP) is filled in areas 16c corresponding to a small diameter cylindrical portion side and 16d corresponding to a tightening portion side, and an intermediate area 16e located between these areas 16c and 16d is filled with a gelatinous filler material 20 similar to that used in the first embodiment which has a certain degree of fluidity with a viscosity in the range of 500-700 (cP).

In the second embodiment shown above, after a wire harness 2' has been inserted into a grommet body 11, a small diameter cylindrical portion 13 is clamped by binding a tape 18 around the small diameter cylindrical portion 13, and the low fluid gelatinous filler material 21 is then poured into an interior 16b of a bag-shaped portion 16, followed by the fluid gelatinous filler material 20. Then the low fluid gelatinous filler material 21 is poured, and thereafter the tightening portion 16a is bound with the tape 18 so as to hermetically seal the interior 16b of the bag-shaped portion 16.

In the second embodiment thus assembled, since the grommet body 11 is rendered airtight in the area corresponding to the wire harness 2' by the gelatinous filler materials 20, 21 in the same manner as the first embodiment to make it positively water-proof and soundproof, the grommet body 11 is easily deformable without having any hard portion difficult to deform in shape therein and can be readily deformed to fit in the inserting hole 3a' of the panel 3'.

Even when an external force is applied to the wire harness 2' after the grommet body 11 has been attached to the panel 3', the applied external force is absorbed to a certain extent by the gelatinous filler materials 20, 21 and will not be transferred to the grommet body 11, and hence, the grommet body 11 is prevented from falling off from the panel 3' by the force applied thereto.

In addition, since the relatively low fluid gelatinous filler material 21 is filled in the areas 16c and 16d of the interior 16b of the bag-shaped portion 16 corresponding to the small diameter cylindrical portion side and the tightening portion side, leaking out of the fluid gelatinous filler material 20 having a certain degree of fluidity can be positively prevented.

It is noted that, since the other structures and functions of the second embodiment are similar to those of the first embodiment shown above, the explanations thereof will be abridged by assigning like reference numbers to like components.

The present invention is not limited to the embodiments mentioned above, but various modifications thereof are possible. For example, the gelatinous filler material is not limited to silicone, but various materials including paraffine, acrylic aqueous gel, urethane aqueous gel, epoxy resin or the like may be used. The viscosity of the gelatinous filler material is not limited to the range mentioned above, but may be set appropriately according to the nature of materials used for the grommet body.

The material and configuration of the grommet are likewise not limited to those mentioned above, but may be changed as required as long as a bag-shaped portion which can sealingly contain the gelatinous filler material therein is provided.

Instead of the tape mentioned above as clamping means, belt means may be utilized. The grommet may be installed in such a direction that the small diameter cylindrical portion is located inside the panel.

As is clearly seen from the aforesaid description, since the grommet according to the present invention is provided with a bag-shaped portion enclosing a wire harness at a spaced relationship therewith and a fluid gelatinous filler material is hermetically sealed within the bag-shaped portion to penetrate through a gap between the outer periphery of the wire harness and the grommet body as well as gaps defined among the electric wires composing the wire harness to fill these gaps, a high degree of waterproof and soundproof properties can be obtained.

In addition, since the gelatinous filler material sealingly contained in the bag-shaped portion in the grommet according to the present invention has a certain degree of fluidity, the wire harness is flexible in the area located in the bag-shaped portion and can be readily deformed to be fitted in a through-hole or the like on a panel.

Furthermore, even when an external force such as tension is applied to the wire harness after the grommet is attached to the panel, since this external force is absorbed by the fluid gelatinous filler material having a certain degree of fluidity, the grommet body is prevented from falling off from the panel 3' by the external force applied to the wire harness.

In addition, the present invention has various advantages such that when a relatively low fluid gelatinous filler material having a relatively higher viscosity is disposed in the areas corresponding to the small diameter cylindrical portion side and the tightening portion side in the interior of the bag-shaped portion, and another gelatinous filler material having a certain degree of fluidity with a relatively low viscosity is disposed in the intermediate area, leakage of the gelatinous filler material having a certain degree of fluidity from the small diameter cylindrical portion or the tightening portion is prevented.

Although the present invention has been fully described by way of example with reference to the accompanying drawings, it is to be noted here that various changes and modifications will be apparent to those skilled in the art. Therefore, unless otherwise such changes and modifications depart from the scope of the present invention as defined by the appended claims, they should be construed as included therein.

What is claimed is:

1. A grommet having a grommet body with a through-hole formed in an intermediate portion thereof for inserting a wire harness therethrough, and which is attached to a panel, said grommet comprising:

engaging means provided at an outer periphery of the grommet body for engagement with an edge of an inserting hole defined in the panel; and a bag-shaped portion protruding from the grommet body proximate to a periphery of said through-hole and having one open end integral with the grommet body, said bag-shaped portion enclosing the wire harness so as to leave a space between the wire harness and said bag-shaped portion, wherein said bag-shaped portion is sealingly filled with a fluid gelatinous filler material and an opposite open end of said bag-shaped portion is securely fitted to an outer periphery of said wire harness.

2. A grommet comprising:

a grommet body;

a first cylindrical portion defining a first aperture in said grommet body;

a second cylindrical portion defining a second aperture, the diameter of which is larger than that of said first cylindrical portion, wherein said first and second cylindrical portions are linked to each other by a linking portion;

a bag-shaped portion enclosed by said second cylindrical portion, having one open end connected to said linking portion between said first and second cylindrical portions, and having an opposite open end which is provided with a tightening portion thereon for forming a through-hole in which a wire harness is sealingly inserted to be supported, wherein said tightening portion is fitted to an outer periphery of the wire harness and a gelatinous filler material is disposed in the interior of said bag-shaped portion; and clamping means for clamping said first cylindrical portion and tightening portion to be tightly fitted to the outer periphery of the wire harness thereby to seal the interior of said bag-shaped portion.

3. A grommet as set forth in claim 2, wherein, at the opposite open ends of said bag-shaped portion corresponding to said first cylindrical portion and said tightening portion, the interior of said bag-shaped portion is filled with an additional gelatinous filler material which is higher in viscosity than the gelatinous filler material which is disposed in an intermediate area located between the opposite open ends in the interior of said bag-shaped portion.

* * * * *